United States Patent
Czimmek

(10) Patent No.: US 8,616,473 B2
(45) Date of Patent: Dec. 31, 2013

(54) HIGH FLOW COMPRESSED NATURAL GAS INJECTOR FOR AUTOMOTIVE APPLICATIONS

(75) Inventor: Perry Robert Czimmek, Williamsburg, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 299 days.

(21) Appl. No.: 13/229,126

(22) Filed: Sep. 9, 2011

(65) Prior Publication Data

US 2013/0062440 A1   Mar. 14, 2013

(51) Int. Cl.
    *B05B 1/30*   (2006.01)
(52) U.S. Cl.
    USPC .................................. 239/585.3; 239/585.4
(58) Field of Classification Search
    USPC ............. 239/584, 585.1, 585.3, 533.9, 533.2, 239/585.4, 585.5; 251/129.15, 129.21, 127
    See application file for complete search history.

(56) References Cited

U.S. PATENT DOCUMENTS

| | | | |
|---|---|---|---|
| 6,264,112 B1* | 7/2001 | Landschoot et al. | 239/5 |
| 6,343,751 B1* | 2/2002 | Ito et al. | 239/585.4 |
| 6,390,067 B1* | 5/2002 | Haltiner et al. | 123/470 |
| 6,422,488 B1* | 7/2002 | Fochtman et al. | 239/585.5 |
| 7,673,847 B2* | 3/2010 | Suzuki et al. | 251/129.08 |
| 2007/0063160 A1 | 3/2007 | Suzuki | |

FOREIGN PATENT DOCUMENTS

| | | |
|---|---|---|
| DE | 10261610 A1 | 7/2004 |
| DE | 102005061424 A1 | 7/2007 |
| EP | 0582296 A1 | 2/1994 |

OTHER PUBLICATIONS

Search Report and Written Opinion of the International Search Authority, PCT/US2012/053863, Dec. 7, 2012.

* cited by examiner

*Primary Examiner* — Davis Hwu

(57) ABSTRACT

An injector (10) includes a valve body (16), an armature tube (20) in the valve body, a seal disk (24) carried by the armature tube, a spring (30) associated with the seal disk, a seat (34) defining an outlet. The seat includes a seat surface (38) engaged with the seal disk that is biased by the spring, when the injector is in a closed position, preventing fuel from exiting the outlet. A movable armature (42) is coupled to an end of the armature tube. An adjusting tube (48) engages an end of the spring. An inlet tube (50) defining an inlet has an end surface that is spaced from the periphery of the armature in the closed position. An electromagnetic coil (58) is disposed about a portion of the inlet tube. A flux member (60) is associated with the coil. A housing (62) covers at least a portion of coil.

20 Claims, 2 Drawing Sheets

HIGH FLOW COMPRESSED NATURAL GAS INJECTOR FOR AUTOMOTIVE APPLICATIONS

FIELD OF THE INVENTION

The invention relates to fuel systems of internal combustion engines for vehicles and, more particularly, a high flow compressed natural gas (CNG) injector.

BACKGROUND OF THE INVENTION

Conventional CNG injectors for automotive applications will not provide adequate flow for customer needs in the near future. To realize the needed flow, such injectors require high lift. However, higher lift for higher flow also introduces durability issues for the injector. Conventional CNG injectors provide 2-3 times less flow than will be needed. In addition, conventional CNG injectors are not capable of long term dry gas durability since there is a tribology issue with chrome plating and stainless alloys, the magnetic components present a soft substrate for coatings, there is inadequate bearing surface area to endure side forces, and there is inadequate impact face area during the opening cycle of the injector.

Thus, there is a need to provide a durable, high flow gaseous injector to provide the proper flow for future customer needs.

SUMMARY OF THE INVENTION

An object of the invention is to fulfill the need referred to above. In accordance with the principles of the present invention, this objective is obtained by providing an injector having an inlet and an outlet for injecting gaseous fuels into an internal combustion engine. The injector includes a valve body in the form of a hollow tube having an interior portion, a hollow, non-metallic armature tube in the interior portion, a seal disk carried by the armature tube, a coil compression spring having a portion disposed in the armature tube, the spring having a first end associated with the seal disk, a seat having a bore there-through defining the outlet. The seat includes an annular seat surface engaged with the seal disk that is biased by the spring, when the injector is in a closed position, preventing fuel from exiting the outlet. A movable, ferro-magnetic armature is coupled to an end of the armature tube. The armature has a bore and an outer periphery, a second end of the spring being received in the bore. An adjusting tube has an end received in the bore and engaging the second end of the spring to adjust compression of the spring. A hollow, ferro-magnetic inlet tube defines the inlet. The adjusting tube is disposed in an interior of the inlet tube. An end surface of the inlet tube, opposite the inlet, is spaced from the periphery of the armature in the closed position of the injector, thereby defining a gap between the end surface and the periphery. An electromagnetic coil is disposed about a portion of the inlet tube. A ferro-magnetic flux member is associated with the coil. A housing covers at least a portion of coil. When the coil is energized, magnetic flux across the gap pulls the armature together with the armature tube towards the inlet so that the periphery of the armature engages the end surface of the inlet tube, thereby lifting the seal disk off of seat surface while compressing the spring, permitting gaseous flow from the inlet through the outlet.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
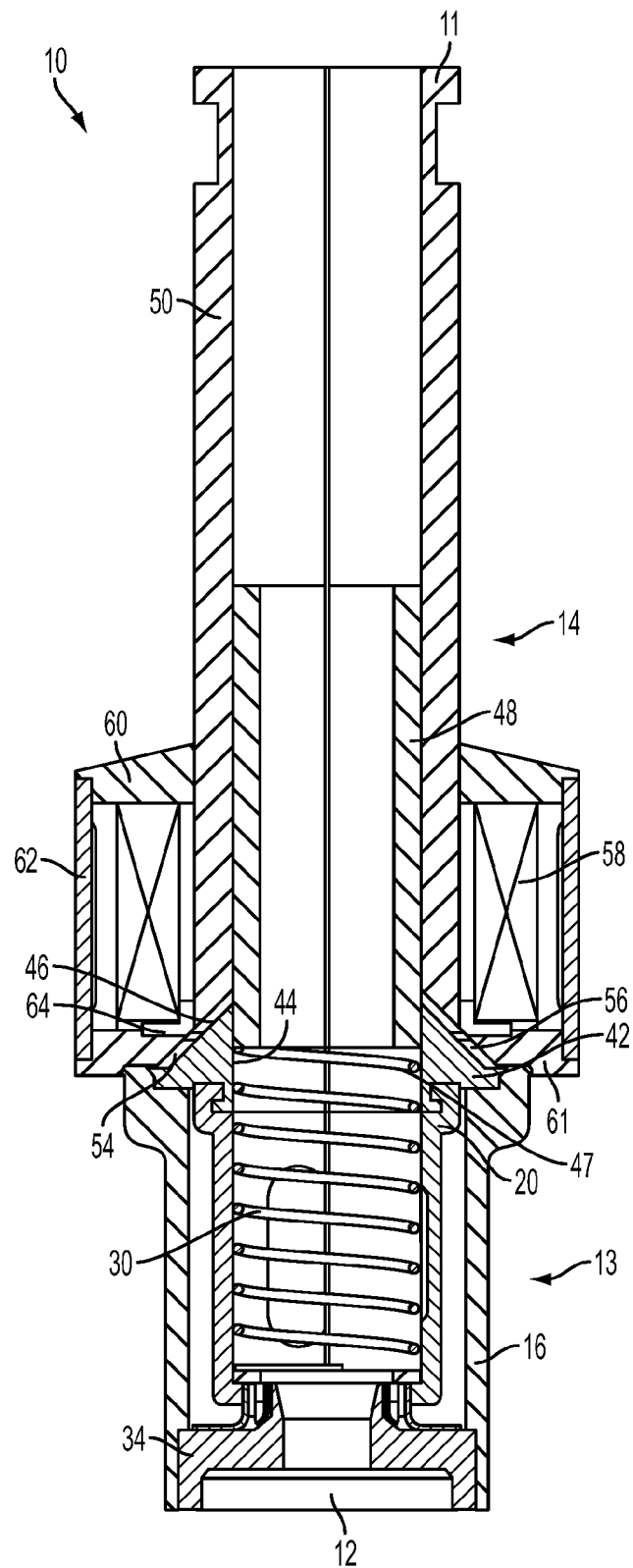
FIG. 1 illustrates a gaseous injector according to an embodiment.

With reference to FIG. 1, a solenoid actuated injector, generally indicated at 10, is shown having an inlet 11 and an outlet 12 in accordance with an embodiment. The injector 10 is constructed and arranged to inject gaseous fuels such as, for example CNG, into an internal combustion engine. The injector 10 includes valve group subassembly 13 and a magnetic group subassembly 14. The valve group subassembly 13 performs fluid handling functions, e.g., defining a fuel flow path and prohibiting fuel flow through the injector 10. The magnetic group subassembly 14 performs power functions, e.g., converting electrical signals to a magnetic driving force for permitting fuel flow through the injector 10.

Figure 2:
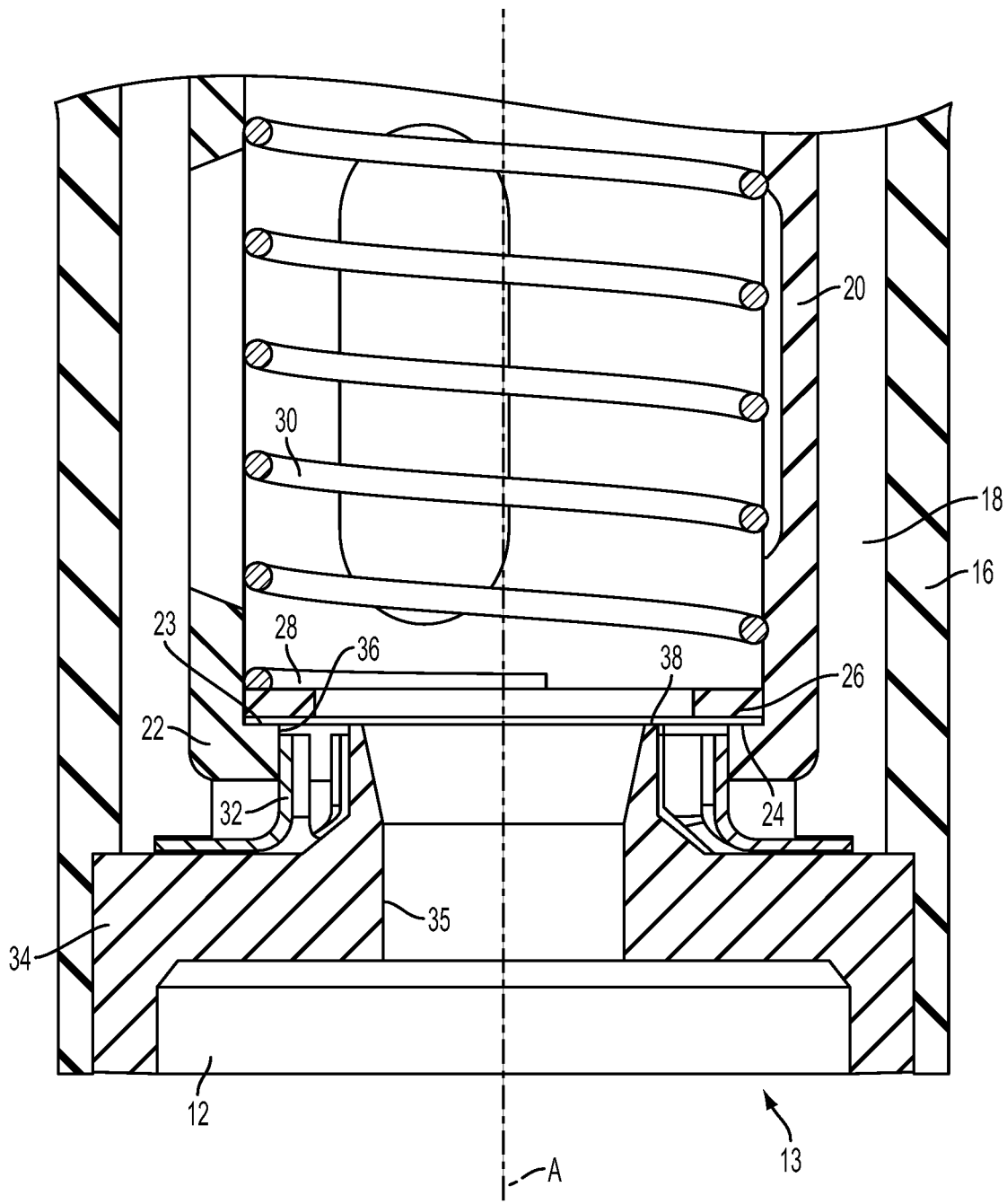
FIG. 2 is an enlarged view of the valve group subassembly of the injector of FIG. 1.

With reference to FIG. 2, the valve group subassembly 13 comprises a valve body 16 in the form of a hollow tube having an interior portion 18. The valve body 16 is preferably drawn and then machined. An armature tube 20 is hollow and is disposed in the interior portion 18. The armature tube 20 is preferably an insert-molded, thermoplastic member and is preferably formed of mineral filled polyphenylene sulphide (PPS). The armature tube 20 includes an annular flange 22 extending towards central axis A that has a surface 23 facing the inlet 11. The surface 23 carries a high alloy seal disk 24, and a ground hard washer 26 is disposed over the seal disk 24. The seal disk 24 can be an alloy, non-magnetic strip steel such as Sandvik 12R11 or Arnavar™. An end 28 of a coil compression spring 30 engages the washer 26. The spring 30 has a low spring rate. A lower guide member 32 of a seat 34 is disposed in an opening 36 defined in the flange 22. The seat 34 has a bore 35 there-through that defines the outlet 12 of the injector 10. The seat 34 includes an annular seat surface 38, extending through the opening 36, that is engaged with the seal disk 24 when the injector 10 is in the closed position, preventing fuel from exiting the bore 35 and thus the outlet 12 of the injector 10. FIGS. 1 and 2 show the injector 10 in the closed position.

Returning to FIG. 1, the magnetic group subassembly 14 comprises a movable armature 42 coupled to an end of the armature tube 20. The armature 42 has a central bore 44 and a generally conical outer periphery 46. The armature 42 is made of ferro-magnetic material such as insert molded 12% Cr ferritic steel. The other end 47 of the spring 30 is received in the bore 34. An end of an adjusting tube 48 is also received in the bore 44 and engages the end 47 of the spring 30. The adjusting tube 48 is disposed in an interior of a hollow inlet tube 50. The inlet tube 50, of ferro-magnetic material has an open end defining the inlet 11 of the injector 10. The adjusting tube 48 is preferably made of thermoplastic and is in interference fit with the inner surface of the inlet tube 50. The adjusting tube 48 can be moved to compress or release compression on the spring 30 to adjust and set a predetermined dynamic characteristic of the armature 42. An end surface 54 of the inlet tube 50, opposite the inlet 11, is conically shaped to complement the conical outer periphery 46 of the armature 42, with the end 54 being spaced from the periphery 46 in the closed position of the injector 10. Thus, in the closed position of the injector 10, a working gap 56 is defined between the periphery 46 and end surface 54, the function of which will be explained below.

An electromagnetic coil 58, in the form of wound wire, is provided about a portion of the inlet tube 50. A flux member or washer 60 of ferro-magnetic material covers a top portion of the coil 58 and a portion 61 of the inlet tube 50 covers a bottom portion of the coil 58. A housing 64, preferably of strip steel, covers an outer peripheral portion of the coil 58. A non-magnetic shell 62 defines a sealing element to ensure the gaseous integrity of the injector in such a way as not to "short circuit" or "shunt" the magnetic flux away from the armature 42.

The coil 58 is connected to a source of power via an over-molded connector (not shown). When energized, the coil 58 generates magnetic flux that flows in a circuit that comprises the inlet tube 50, a working air gap 56 between the inlet tube 50 and armature 42, and flux washer 60. The magnetic flux across the gap 56 pulls the armature 42 axially towards the inlet 11 so that the conical periphery 46 of the armature 42 engages the conical end surface 54 of the inlet tube 50 (stator). Since the armature 42 is coupled to the armature tube 20, the armature tube 20 moves with the armature 42 and lifts the seal disk 24 off of seat surface 38 while compressing the spring 30, thereby permitting CNG flow from the inlet 52 through the outlet 12. Once the coil 58 is de-energized, the spring forces the washer 26 and thus the seal disk 24 back into engagement with the seat surface 38, closing the outlet 12.

The valve body 13 of the valve group subassembly 13 is coupled to the inlet tube 50 of the magnetic group subassembly 14 to assembly the injector 10, making the injector 10 a modular configuration.

Advantages of the injector 10 include that there is no metal-to-metal sliding bearings, but bearing surface areas are maximized; no coatings or platings are required, with the stator minimum gap being set by a non-magnetic hardstop; there are no metal magnetic leakage paths through the injector, since the working gap 56 is angled; there is no side loading of the spring 30 at the armature 42, since the 47 of the spring is below the top of the armature and the spring is disposed substantially in the armature tube 20; and a flow rate of the injector 10 is increased as compared to conventional high-flow CNG injectors.

Other features of the injector 10 include that the armature volume is optimized for minimum moving mass; and the seal disk 24 is of semi-compliant metal for minimum leakage and has a high fatigue limit and high hardness. Although the injector 10 has been described for use with CNG, the injector 10 can be used in any gaseous automotive platform, for example, hydrogen.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An injector having an inlet and an outlet for injecting gaseous fuels into an internal combustion engine, the injector comprising:
   a valve body in the form of a hollow tube having an interior portion,
   a hollow, non-metallic armature tube in the interior portion,
   a seal disk carried by the armature tube,
   a coil compression spring having a portion disposed in the armature tube, the spring having a first end associated with the seal disk,
   a seat, having a bore there-through defining the outlet, the seat including an annular seat surface engaged with the seal disk that is biased by the spring, when the injector is in a closed position, preventing fuel from exiting the outlet,
   a movable, ferro-magnetic armature coupled to an end of the armature tube, the armature having a bore and an outer periphery, a second end of the spring being received in the bore,
   an adjusting tube engaging the second end of the spring to adjust compression of the spring,
   a hollow, ferro-magnetic inlet tube defining the inlet, the adjusting tube being disposed in an interior of the inlet tube, an end surface of the inlet tube, opposite the inlet, being spaced from the periphery of the armature in the closed, thereby defining a gap between the end surface and the periphery,
   an electromagnetic coil disposed about a portion of the inlet tube,
   a ferro-magnetic flux member associated with the coil, and
   a housing covering at least a portion of coil,
   wherein, when the coil is energized, magnetic flux across the gap pulls the armature together with the armature tube towards the inlet so that the periphery of the armature engages the end surface of the inlet tube, thereby lifting the seal disk off of seat surface while compressing the spring, permitting gaseous flow from the inlet through the outlet.

2. The injector of claim 1, wherein the armature tube includes an annular flange extending towards a central axis of the injector, the flange having a surface facing the inlet, the seal disk being carried by the surface.

3. The injector of claim 2, wherein the flange defines an opening, a portion of the seat being disposed in the opening.

4. The injector of claim 3, wherein the seat surface extends through the opening in the flange.

5. The injector of claim 1, wherein the periphery of the armature is conical and the end surface of the inlet tube is conical so as to mate when engaged.

6. The injector of claim 1, further comprising a washer disposed over the seal disk, the first end of the spring engaging the washer.

7. The injector of claim 1, wherein the armature tube and adjusting tube are made of thermoplastic.

8. The injector of claim 1, wherein the seal disk is composed of an alloy, non-magnetic strip steel.

9. The injector of claim 1, wherein flux member covers a top portion of the coil and the housing covers an outer peripheral portion of the coil.

10. The injector of claim 1, wherein the valve body is coupled to the inlet tube.

11. The injector of claim 1, wherein the adjusting tube is in interference fit with the inlet tube.

12. An injector having an inlet and an outlet for injecting gaseous fuels into an internal combustion engine, the injector comprising:

a valve body in the form of a hollow tube having an interior portion, a hollow, non-metallic armature tube provided in the interior portion, the armature tube including an annular flange extending towards a central axis of the injector, the flange having a surface facing the inlet, a seal disk carried by surface of the flange, a washer disposed over the seal disk, a coil compression spring having a portion disposed in the armature tube, the spring having a first end engaged with the washer, a seat, having a bore there-through defining the outlet, the seat including an annular seat surface engaged with the seal disk that is biased by the spring, when the injector is in a closed position, preventing fuel from exiting the outlet, a movable, ferro-magnetic armature coupled to an end of the armature tube, the armature having a bore and an outer periphery, a second end of the spring being received in the bore, an adjusting tube having an end received in the bore and engaging the second end of the spring to adjust compression of the spring, a hollow, ferro-magnetic inlet tube defining the inlet, the adjusting tube being disposed in an interior of the inlet tube, an end surface of the inlet tube, opposite the inlet, being spaced from the periphery of the armature in the closed position of the injector, thereby defining a gap between the end surface and the periphery, an electromagnetic coil disposed about a portion of the inlet tube, a ferro-magnetic flux member associated with the coil, and a housing covering at least a portion of coil, wherein, when the coil is energized, magnetic flux across the gap pulls the armature together with the armature tube towards the inlet so that the periphery of the armature engages the end surface of the inlet tube, thereby lifting the seal disk off of seat surface while compressing the spring, permitting gaseous flow from the inlet through the outlet.

13. The injector of claim 12, wherein the flange defines an opening, a portion of the seat being disposed in the opening.

14. The injector of claim 13, wherein the seat surface extends through the opening in the flange.

15. The injector of claim 12, wherein the periphery of the armature is conical and the end surface of the inlet tube is conical so as to mate when engaged.

16. The injector of claim 12, wherein the armature tube and adjusting tube are made of thermoplastic.

17. The injector of claim 12, wherein the seal disk is composed of an alloy, non-magnetic strip steel.

18. The injector of claim 12, wherein flux member covers a top portion of the coil and the housing covers an outer peripheral portion of the coil.

19. The injector of claim 12, wherein the valve body is coupled to the inlet tube.

20. The injector of claim 12, wherein the adjusting tube is in interference fit with the inlet tube.

* * * * *